Jan. 10, 1961    J. N. STAHLEY    2,967,709
ATHLETIC TRAINING APPARATUS
Filed Nov. 12, 1959    3 Sheets-Sheet 1
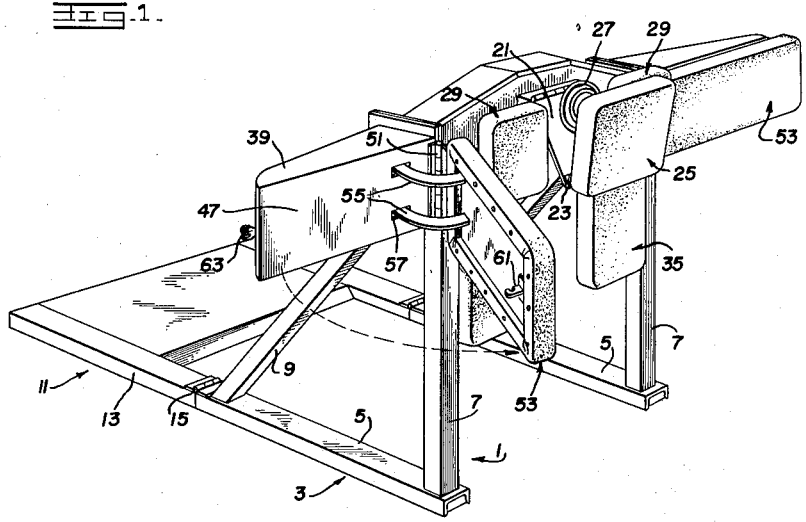
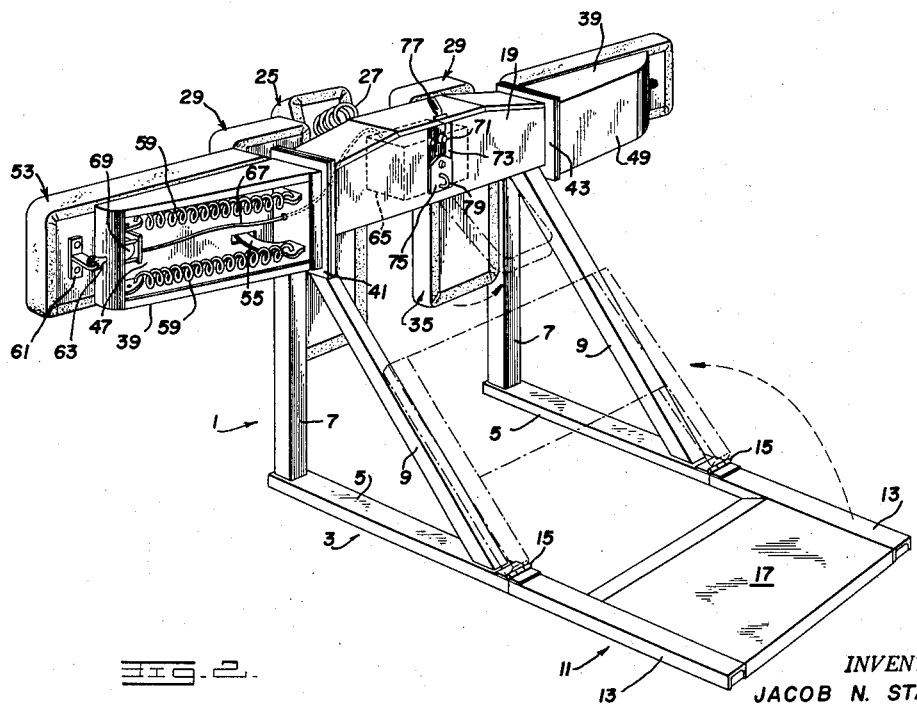
INVENTOR.
JACOB N. STAHLEY
BY Shanley & O'Neil
ATTORNEYS Jan. 10, 1961 J. N. STAHLEY 2,967,709
ATHLETIC TRAINING APPARATUS
Filed Nov. 12, 1959 3 Sheets-Sheet 2
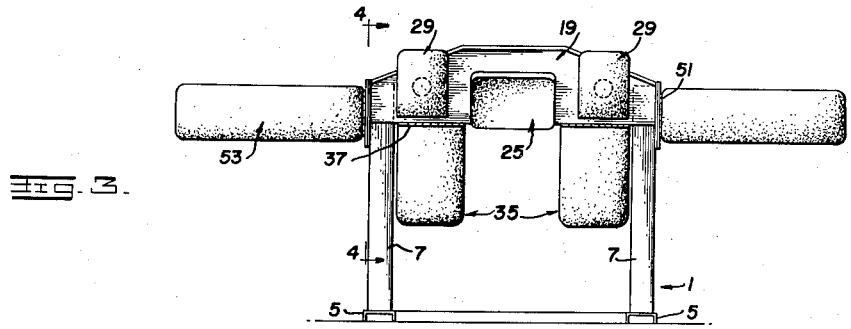
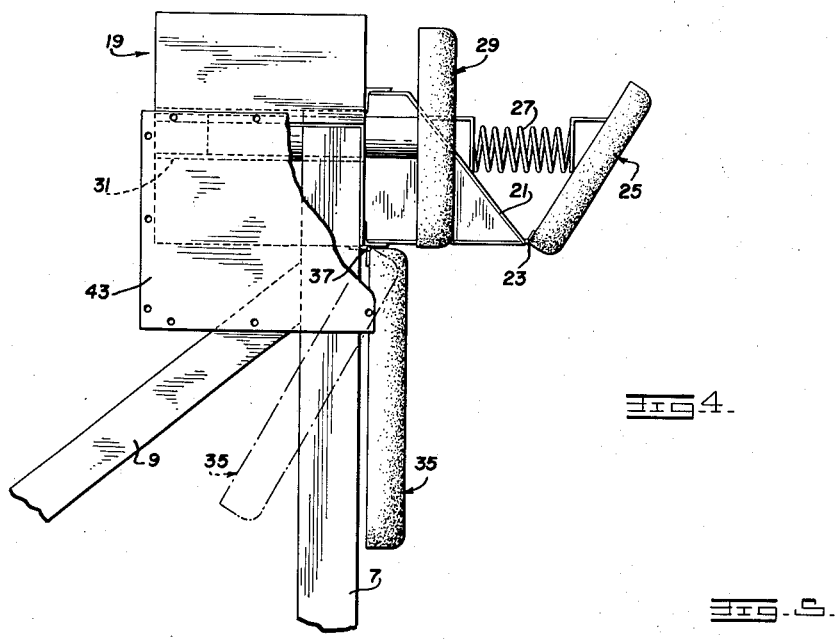
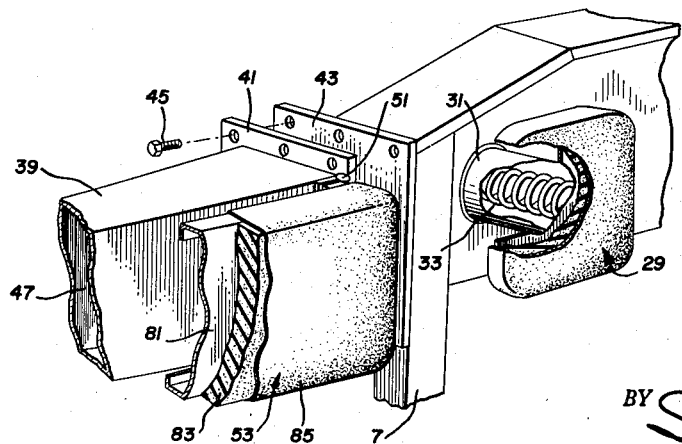
INVENTOR.
JACOB N. STAHLEY
BY Shanley & O'Neil
ATTORNEYS Jan. 10, 1961  J. N. STAHLEY  2,967,709
ATHLETIC TRAINING APPARATUS
Filed Nov. 12, 1959  3 Sheets-Sheet 3
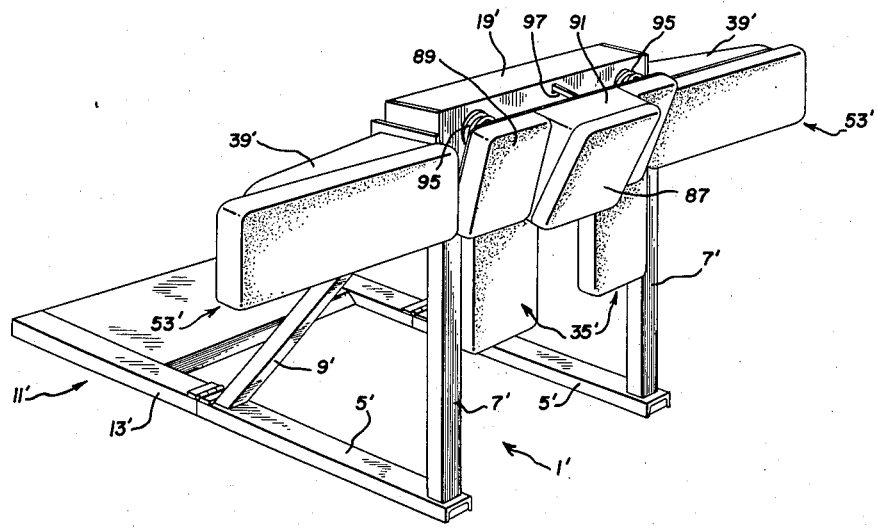
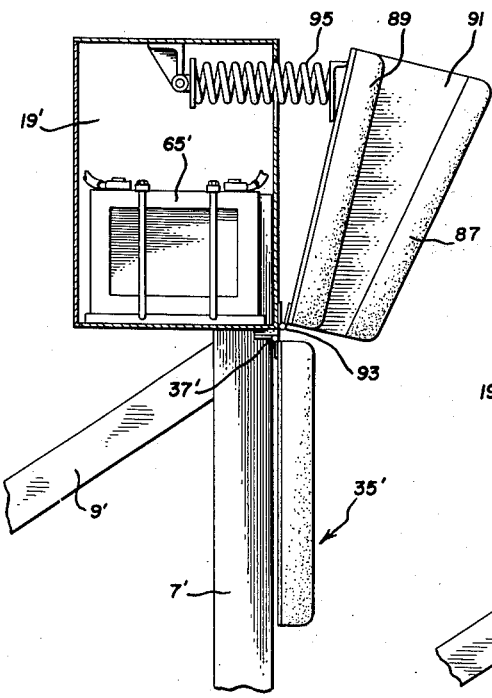
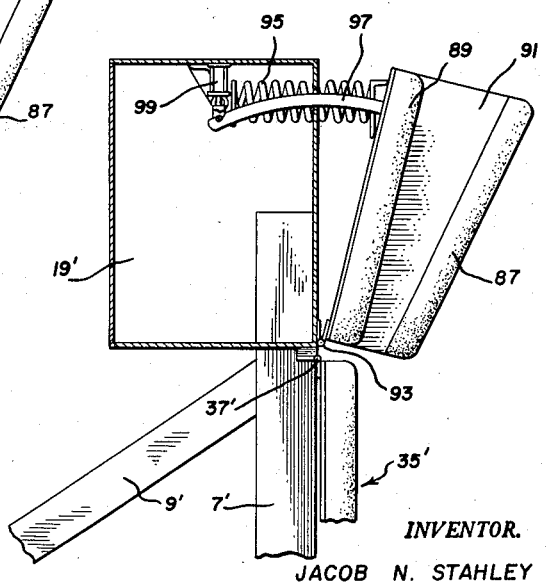
INVENTOR.
JACOB N. STAHLEY
BY Shanley & O'Neil
ATTORNEYS

United States Patent Office 2,967,709
Patented Jan. 10, 1961

2,967,709

ATHLETIC TRAINING APPARATUS

Jacob N. Stahley, 515 S. Hayes St., Moscow, Idaho

Filed Nov. 12, 1959, Ser. No. 852,397

7 Claims. (Cl. 273—55)

The present invention relates to athletic training apparatus, and more particularly to such apparatus for training players in football defensive tactics.

An object of the present invention is the provision of athletic training apparatus designed to simulate a three-man offensive front in a football line.

Another object of the present invention is the provision of athletic training apparatus useful in carrying out a variety of defensive line drills.

A further object of the present invention is the provision of athletic training apparatus useful in improving defensive line play by quickening defensive reactions, developing body balance, increasing peripheral vision and stimulating lateral agility in individual players.

Still another object of the present invention is the provision of athletic training apparatus having moving parts selectively operable by a trainer to simulate any of a variety of movements of an offensive front in a football line.

Finally, it is an object of the present invention to provide athletic training apparatus that will be relatively simple and inexpensive to manufacture, easy to operate, maintain and repair, and rugged and durable in use.

Other objects and advantages of the invention will become apparent from a consideration of the following disclosure, taken in connection with the accompanying drawings, in which:

Figure 1 is a front perspective view of athletic training apparatus according to the present invention;

Figure 2 is a rear perspective view of athletic training apparatus according to the present invention;

Figure 3 is a front elevational view of the device of Figures 1 and 2;

Figure 4 is a side cross-sectional view taken on the line 4—4 of Figure 3;

Figure 5 is an enlarged fragmentary perspective view of a central rear portion of athletic training apparatus according to the present invention;

Figure 6 is a view similar to Figure 1 but showing a modified form of the invention;

Figure 7 is a side cross-sectional view through the modified form of Figure 6; and Figure 8 is a view similar to Figure 7 but taken through a different portion of the modified form of Figure 6.

Referring now to the drawings in greater detail, and first with reference to the embodiment of Figures 1 through 5, there is shown athletic training apparatus including a support comprising a base 1 which includes a front section 3 having a pair of parallel ground engaging base members 5 which support rigidly at their forward ends uprights 7 and at their rear ends diagonal braces 9 extending between the rear ends of base member 5 and the upper ends of uprights 7. A rear section 11 of support 1 is comprised of a pair of parallel ground engaging base members 13 secured at their forward ends to the rear ends of base members 5 by means of horizontal hinges 15, so that rear section 11 may fold into the phantom line position shown in Figure 2 for shipping.

A weight 17 such as a cast iron slab extends between and is secured to base members 13 for the purpose of stabilizing and preventing undue skidding of the device in use.

Extending between and secured to the upper ends of uprights 7 and diagonal braces 9 is a support frame 19 on which all the body-contacting portions of the present invention are mounted. A forwardly and downwardly inclined support plate 21 is mounted on the front central portion of frame 19 and carries at its lower edge a horizontal hinge 23 to which is hingedly secured the lower edge of a padded central first impact member 25 for swinging movement about the axis of hinge 23. A coil compression spring 27 is generally horizontally disposed and acts between the rear of impact member 25 and the front of support plate 21 continuously to urge the upper end of impact member 25 to the front relative to the lower end thereof, that is, to urge impact member 25 to swing clockwise as seen in Figure 4. It is intended that the impact of a portion of a trainee's body on member 25 will compress spring 27 and cause impact member 25 to swing in the opposite direction.

Padded second impact members 29 are mounted one on each side of impact member 25 on the front of support frame 19. Impact members 29 are at about the same elevation as member 25 but are spaced to the rear thereof. Instead of being forwardly upwardly inclined, as is member 25, impact members 29 are upright, so that a trainee approaching them from the front approaches them squarely. The mounting for members 29 on support frame 19 consists of a telescoping tubing support 31, one telescoping tubing member of which is mounted on support frame 19 and the other telescoping tubing member of which is carried by the rear of impact member 29. A coil compression spring 33 disposed within the telescoping tubing continuously urges member 29 to the front and yieldably permits rearward movement of member 29 upon contact with a trainee's body.

Depending padded third impact members 35 are mounted by their upper ends on horizontal hinges 37 disposed along the front lower edge of support frame 19. Hinges 37, and hence members 35, are in lateral alignment with each other and directly below member 29, one on either side of the space between the uprights 7. Members 35 are thus laterally spaced apart to provide a tunnel therebetween and are adapted by their hinged mounting to swing to the rear, as seen in phantom line in Figure 2.

Extending endwise beyond the ends of support frame 19 are two wing supports 39 having flanges 41 disposed in a vertical plane at their inner ends and adapted to engage with corresponding flanges 43 on opposite ends of support frame 19 and be detachably held thereon by horizontal removable bolts 45. Each wing support 39 is in the general form of a hollow elongated box having a flat front plate 47 disposed in the same plane as the front of support frame 19, and a removable back plate 49 by which access is had to the interior of support 39. A vertical hinge 51 is carried by the front inner end of each wing support 39 immediately adjacent the corresponding flange 41, and a wing member 53 is mounted for horizontal swinging movement about a vertical axis disposed adjacent its inner end on hinge 51. The wing members 53 are thus movable, from spread-apart relationship, to the front and center toward each other, and back, upon horizontal swinging movement about the vertical axes of hinges 51.

Means are provided continuously urging wing members 53 toward the front and center. To this end, each wing member is provided with a pair of vertically spaced lever arms 55 secured to the rear of the wing member adjacent hinge 51. Each lever arm 55 is arcuate about the axis of hinge 51 and extends generally to the rear. Lever arms 55 are in the form of flat straps and their principal planes are horizontal and parallel to each other. Each arm 55 extends through a correspondingly shaped opening 57 in front plate 47 and terminates in a free end to which is attached one end of a tension spring 59, the other end of each spring 59 being secured to the outer end of its wing support 39 on the interior thereof. Thus, tension springs 59 extend lengthwise of wing supports 39 and continuously urge wing members 53 to the front and center toward each other.

Secured to the rear of the outer end of each wing member 53 is a fixed rearwardly extending latch member 61 adapted to engage in the spread-apart position of the wing members with a retractable spring-urged latch member 63 carried by and extending through the outer end of wing support 39 and reciprocable lengthwise of its associated wing support between a retracted or releasing position and an extended or retaining position for the latch member 61. Means are provided for selectively releasing one or the other or both of the latch means which hold the wing members in spread-apart position, thereby selectively to permit one or the other or both of wing members 53 to swing to the front and center toward each other. These actuator means include a storage battery 65 having electrical connections 67 extending therefrom each of the latch mechanism actuators comprising solenoids 69 adapted to retract latch members 63 against the force of their spring when actuated. A pair of control switch buttons 71 is provided for selectively switching one or the other or both of solenoids 69 into electrical circuit with the battery, switch buttons 71 extending through the side walls of support frame 19 and being disposed in a recess 73 in that support frame so that they are disposed on a rear central portion of the device and are accessible from the rear and center of the device and provide actuator means for effecting release of wing members 53. A cover plate 75 is mounted for vertical swinging movement in its own plane up and over recess 73; and a hasp 77 carried by the top of support frame 19 swings down over a staple 79 carried by cover plate 75 for the reception of a lock to prevent unauthorized access to the controls of the device.

The particular construction of the padded impact and wing members 25, 29, 35 and 53 is best seen in Figure 5 in the case of a wing member 53, it being understood that the same construction is used for all impact members. As there shown, the padded construction is backed up by a back plate 81 on the front of which is positioned padding 83 which may be cellular rubber, horsehair, coarse fiber or cotton or wool batting, or the like. A cover 85, which may be canvas or leather or other tough and flexible material, entirely covers padding 83 and is secured to back-up plate 81.

In operation, the device is positioned as seen in full line in Figure 2, and a trainer stations himself behind support frame 19 and to the side of support 1. The device is now ready for use in the execution of a variety of defensive line drills.

For example, to execute a two on one with a hand charge, the trainee assumes a defensive stance in front of the front central portion of the device. A center, in an offensive position adjacent to the machine, snaps the ball. The trainee then hand charges the machine, striking members 29, which approximate the position of shoulders of an offensive player. The trainee keeps his feet moving in place. At about the time the trainee contacts members 29, the trainer standing behind and to the side of the machine operates a switch button 71 to release one or the other of wing members 53, thereby to simulate an offensive player's flanking charge. The trainee reacts into the striking wing with a defensive hand or forearm charge. To execute a two on one with a shoulder charge, the trainee repeats the preceding drill except that he shoulder charges impact member 25 instead of hand charging impact members 29, and upon release of the striking wing reacts with a defensive hand, forearm or shoulder charge. A three on one with a submarine charge can also be executed. The trainee assumes a defensive stance in front of the machine, and the center snaps the ball. The trainee either hand charges impact members 29 or shoulder or forearm charges impact member 25, keeping his feet moving in place the while. At about the time the trainee contacts the device, the trainer operates both switch buttons, thereby releasing both wing members 53 to simulate a wedge charge or three on one offensive ratio to defense. The trainee reacts by performing a submarine charge through the tunnel-like aperture guarded by the two pendulum-type impact members 35.

Drills involving live offensive players in addition to the present training apparatus and the defensive trainee may also be executed. For example, tackling drills may be carried out by the trainee assuming a defensive stance in front of the machine. A center in an offensive position adjacent the machine snaps the ball to a back who is immediately behind support 1. The back has previously alerted which of the wing members 53 will be released. On the snap of the ball the trainee hand charges the impact members 29 or shoulder or forearm charges impact member 25, keeping his feet moving in place the while. At about this time, the trainer operates the control knob 71 corresponding to the predetermined wing member 53. The back, upon receiving the ball, runs to the side of the machine on which the wing member was released. He must run between the machine and a standing dummy positioned about five yards to the side of the machine. The trainee, for his part, first reacts into the striking wing with a defensive hand, forearm or shoulder charge, and then slides into position to tackle the ball carrier. Pursuit drills can also be carried out in the same manner as tackling drills, except that after reacting to the striking wing, the trainee runs back on a proper angle in pursuit of the ball carrier.

A modified form of the present invention is shown in Figures 6, 7 and 8. This modified form of the device is largely the same as the embodiment just described, and primed reference numerals indicate the same parts as in the previous embodiment. However, the modification of Figures 6 through 8 differs from the other modification in that impact members 25 and 29 and their associated structure are replaced by impact members 87 and 89, respectively. These latter impact members, as distinguished from members 25 and 29, are all three mounted on a common frame 91 so that they are in unitary assembly with each other. Frame 91, in turn, is mounted for vertical swinging movement along its lower edge on a single horizontal hinge 93 of the piano hinge type, so that impact members 87 and 89 swing together as a unit about the axis of hinge 93. This unitary assembly of modified impact members is continuously urged clockwise as seen in Figures 7 and 8 by a pair of coil compression springs 95 which act at their forward ends against the upper rear of frame 91 and at their rear ends against fixed abutments within the housing.

A rod 97 extends rearwardly from the upper rear of frame 91 and is arcuate about the axis of hinge 93. Rod 97 at its inner or free end is provided with a notch within which the engaging pin of a solenoid-retracted catch 99 is disposed in the deactuated position of the solenoid of the catch. The solenoid of catch 99 is in circuit with battery 65' by means of wires (not shown); and a third switch button 71 (not shown) is provided adjacent the other two for the purpose of selectively actuating the solenoid of catch 99 to withdraw the catch from the notch of rod 97 thereby to permit coil compression springs 95 to move frame 91 and impact members 87 and 89 clockwise as seen in Figures 7 and 8 about the axis of hinge 93. When the solenoid of catch 99 is deactuated and the catch member is in its lowered position, the assembly of members 97 and 99 may be recocked by forcing frame 91 counterclockwise as seen in Figures 7 and 8 until catch 99 seats in the notch of rod 97 to await the next release of the impact members upon actuation of the associated solenoid.

The operation of this modified form of the invention is quite similar to the operation of the previous embodiment, except that release of the impact members 87 and 89 now serves as the signal for the defensive lineman or trainee. The coach or trainer stands in the same position as before and actuates the solenoid of catch 99 to release the impact members as the signal to the trainee to charge defensively either with a forearm shiver or a shoulder charge. The trainee, as before, strikes one or more of the impact members, thereby cocking the mechanism including members 97 and 99 for the next operation. At about the same time, the coach releases one or both of the wing mechanisms and the trainee then hits either wing member with a forearm shiver or a shoulder charge. If both wing mechanisms are released, the trainee as before submarines under the tunnel-like aperture at the center of the machine.

From a consideration of the foregoing disclosure, it will be obvious that all of the initially recited objects of the present invention have been achieved.

Although the present invention has been described and illustrated in connection with preferred embodiments, it is to be understood that modifications and variations may be resorted to without departing from the spirit of the invention as those skilled in this art readily understand. Such modifications and variations are considered to be within the purview of the scope of the present invention as defined by the appended claims.

What is claimed is:

1. Athletic training apparatus comprising a support, an impact member mounted on the front of the support for contact with a portion of the body of a trainee, a pair of wing members mounted on the support one on either side of the impact member for swinging movement about upright axes disposed on the impact member side of the wing members, means continuously urging the wing members to swing to the front toward each other about said axes, means for releasably retaining the wing members in spread-apart relationship, and means for selectively individually releasing the wing members for swinging movement to the front under the influence of said urging means.

2. Athletic training apparatus comprising a support, a central impact member mounted centrally on the front of the support for contact with a portion of the body of a trainee, a pair of side impact members mounted on the support one on either side of the central impact member for substantially horizontal movement to the front toward each other, means continuously urging the side impact members toward the front and center, means for releasably retaining the side impact members in spread-apart relationship, and means for selectively individually releasing the side impact members for movement to the front and center under the influence of said urging means.

3. Athletic training apparatus comprising a support, an impact member mounted on the front of the support for contact with a portion of the body of a trainee, a pair of elongated wing members mounted horizontally on the support one on either side of the impact member for horizontal swinging movement about upright axes disposed adjacent the inner ends of the wing members, tension members extending lengthwise of the wing members and acting between the support and the wing members adjacent said axes continuously to urge the wing members to swing to the front toward each other about said axes, means for releasably retaining the wing members in spread-apart relationship, and means for selectively individually releasing the wing members for swinging movement to the front under the influence of the tension members.

4. Athletic training apparatus as claimed in claim 3, said means for releasably retaining the wing members in spread-apart relationship comprising latch means on the wing members adjacent the outer ends thereof engaging with releasable latch means on the support in the spread-apart position of the wing members.

5. Athletic training apparatus as claimed in claim 3, said means for selectively individually releasing the wing members comprising actuator means mounted on a central rear portion of the support.

6. Athletic training apparatus comprising a support, an impact member mounted on the front of the support for contact with a portion of the body of a trainee, a pair of elongated wing members mounted horizontally on the support one on either side of the impact member for horizontal swinging movement about upright axes disposed adjacent the inner ends of the wing members, lever arms extending rearwardly from the wing members adjacent said axes, tension members extending lengthwise of the wing members and acting between the support and the lever arms continuously to urge the wing members to swing to the front toward each other about said axes, means for releasably retaining the wing members in spread-apart relationship, and means for selectively individually releasing the wing members for swinging movement to the front under the influence of the tension members.

7. Athletic training apparatus comprising a support, a first impact member mounted on the front of the support for contact with a portion of the body of a trainee, a pair of second impact members mounted on the front of the support one on either side of and to the rear of said first impact member for contact with portions of the body of a trainee, and a pair of third impact members mounted on the support adjacent their upper ends one below each said second impact member for rearward swinging movement, and a pair of wing members mounted on the support one on the outer side of each said second impact member for swinging movement about upright axes disposed on the impact member side of the wing members, means continuously urging the wing members to swing to the front toward each other about said axes, means for releasably retaining the wing members in spread-apart relationship, and means for selectively individually releasing the wing members for swinging movement to the front under the influence of said urging means.

References Cited in the file of this patent
UNITED STATES PATENTS

| | | |
|---|---|---|
| 1,436,846 | Williman | Nov. 28, 1922 |
| 1,916,385 | Oakes | July 4, 1933 |

UNITED STATES PATENT OFFICE
CERTIFICATION OF CORRECTION

Patent No. 2,967,709                        January 10, 1961

Jacob N. Stahley

It is hereby certified that error appears in the above numbered patent requiring correction and that the said Letters Patent should read as corrected below.

Column 3, line 25, after "from" insert -- to --.

Signed and sealed this 15th day of August 1961.

(SEAL)
Attest:

ERNEST W. SWIDER                        DAVID L. LADD
Attesting Officer                          Commissioner of Patents